(12) United States Patent
Mui

(10) Patent No.: US 6,674,519 B2
(45) Date of Patent: Jan. 6, 2004

(54) OPTICAL PHASE FRONT MEASUREMENT UNIT

(75) Inventor: Peter H. Mui, Fairfax, VA (US)

(73) Assignee: Northrop Grumman Corporation, Los Angeles, CA (US)

( * ) Notice: Subject to any disclaimer, the term of this patent is extended or adjusted under 35 U.S.C. 154(b) by 201 days.

(21) Appl. No.: 10/036,582

(22) Filed: Dec. 21, 2001

(65) Prior Publication Data

US 2003/0117615 A1 Jun. 26, 2003

(51) Int. Cl.$^7$ ............................... G01J 1/00; G01J 1/20
(52) U.S. Cl. ..................... 356/121; 356/488; 250/201.9
(58) Field of Search ................................. 356/121, 488; 250/201.9, 237 R, 237 G

(56) References Cited

U.S. PATENT DOCUMENTS

| | | | |
|---|---|---|---|
| 4,141,652 A | | 2/1979 | Feinleib |
| 4,399,356 A | | 8/1983 | Feinleib et al. |
| 4,725,138 A | | 2/1988 | Wirth et al. |
| 4,737,621 A | | 4/1988 | Gonsiorowski et al. |
| 4,854,677 A | | 8/1989 | O'Meara |
| 5,146,073 A | * | 9/1992 | Wirth et al. ............ 250/201.9 |
| 5,164,578 A | | 11/1992 | Witthoft et al. .......... 250/201.9 |
| 6,163,381 A | | 12/2000 | Davies et al. |
| 6,201,589 B1 | | 3/2001 | Tombling et al. |
| 6,219,360 B1 | | 4/2001 | Komine |

OTHER PUBLICATIONS

Benton, Abstract of Practical Holography IV; Proceedings of the Meeting, Los Angeles, CA. Jan. 18, 19 1990, publication date May 1990. Sponsored by SPIE.

Chen, et al, Abstract of "Aberration Correction by Electron Holography Using a Liquid Crystal Spatial–Light Modulator" publication date Sep. 1993, *Proc, SPIE vol. 1889, p. 34–38, Holography, Inteferometry, and Optical Pattern Recognition in Biomedicine III.*

Tee, et al., Abstract of "Phase Modulation Using the Silicon Backplane Spatial Light Modulator and Transmissive Glass" publication date Oct. 1999, Proc. SPIE vol. 3805, p. 19–29, Photonic Devices and Algorithms for Computing.

Banas, et al., Abstract of "256 x 256 Ferroelectric Liquid Crystal Spatial Light Modulator", publication date Apr. 1997 *Proc. SPIE vol. 3015, p. 114–124, Liquid Crystal Materials, Devices and Applications V.*

Bauchert, et al, Abstract of "High–Speed Multilevel 512 x 512 Spatial Light Modulator", publication date Mar. 2000 *Proc. SPIE vol. 4043, p. 59–65, Optical Pattern Recognition XI.*

Justh, et al., Abstract of "Adaptive Wavefront Control Using a Nonlinear Zernike Filter", publication date Nov. 2000 *Proc. SPIE vol. 4124, p. 189–200, High Resolution Wavefront Control: Methods, Devices and Applications II.*

* cited by examiner

*Primary Examiner*—Frank G. Font
*Assistant Examiner*—Roy M Punnoose
(74) *Attorney, Agent, or Firm*—Suzanne J. Heeg

(57) ABSTRACT

An adaptive optics system configured as an optical phase front measurement system which provides for relatively high resolution sampling as in holographic techniques but without the need for a reference beam. The optical phase front measurement system includes one or more lenses and a spatial light modulator positioned at the focal plane of the lenses and a camera which enables the phase front to be determined from intensity snapshots. The phase front measurement system allows for relatively long range applications with relatively relaxed criteria for the coherence length of the laser beam and the Doppler shift. As such, the system is suitable for a wide variety of applications including astronomy, long range imaging, imaging through a turbulent medium, space communications, distant target illumination and laser pointing stabilization.

15 Claims, 2 Drawing Sheets

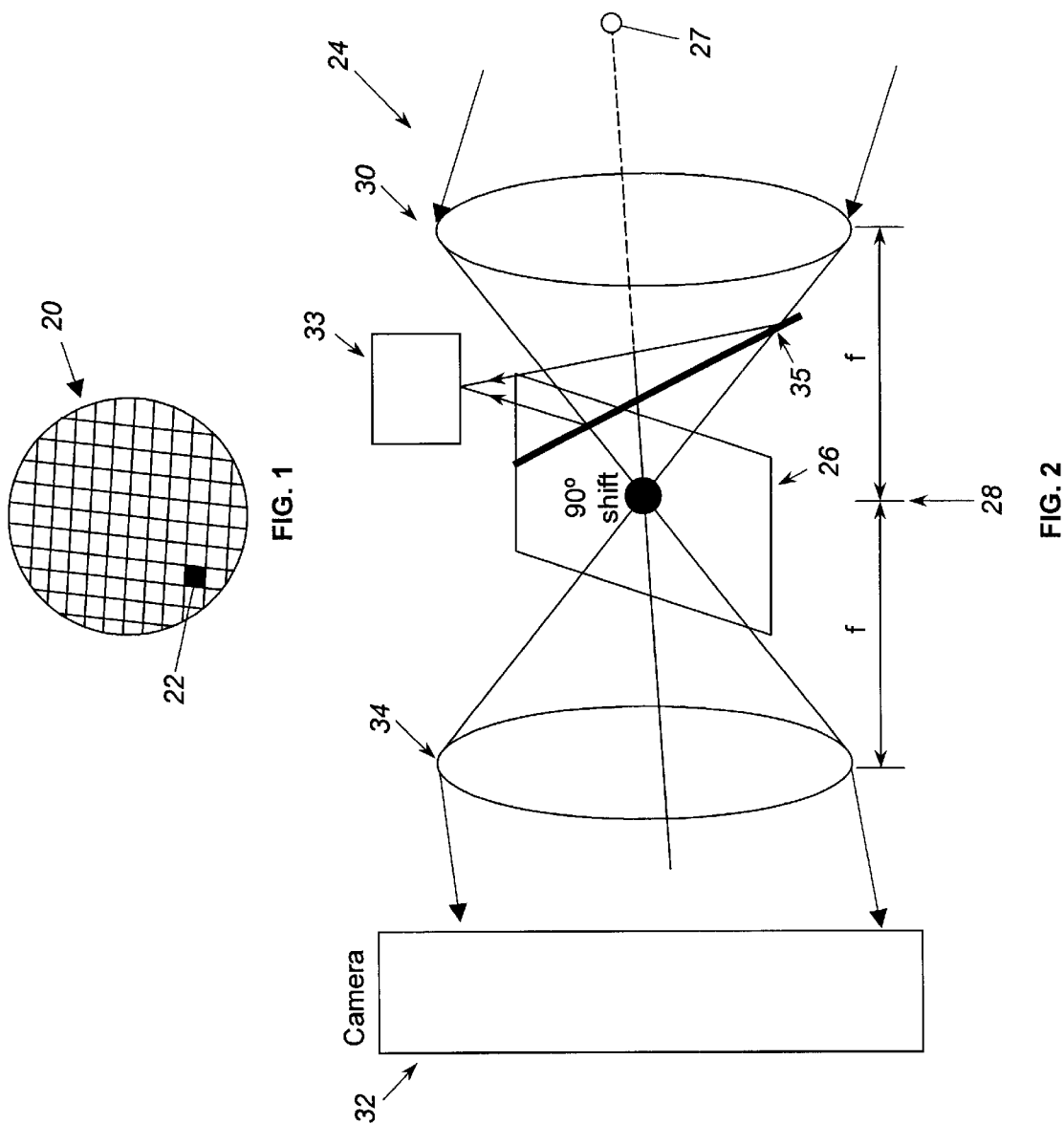

OPTICAL PHASE FRONT MEASUREMENT UNIT

BACKGROUND OF THE INVENTION

1. Field of the Invention

The present invention relates to an adaptive optics system and more particularly to an adaptive optics system configured as an optical phase front measurement system which relies on diffraction rather than interference and includes a spatial light modulator for decoding a beam phase front and provides relatively dense phase front sampling as in holographic systems but without the need for a reference beam.

2. Description of the Prior Art

Optical signals are known to be distorted when passed through a time varying inhomogeneous medium, such as a turbulent atmosphere, ocean or biological tissue. Various optical systems are known which compensate for the distortion in a wavefront during such conditions. Such adaptive optics systems include one or more wavefront sensors for estimating the distortion of the wavefront of an optical signal. These distortion estimates are used to generate correction signals, which, in turn, are typically fed to the actuators of a deformable mirror or a spatial light modulator in order to correct for the wavefront distortion.

Various wavefront sensors are known in the art. Such wavefront sensors are known to have limitations during certain conditions. For example, both unit shear lateral shearing interferometer (LSI) wavefront sensors and Hartmann wavefront sensors are extremely well known in the art. Such sensors are disclosed, in general, for example, in "Principles of Adaptive Optics," Second Edition, Robert K. Tyson, Academic Press, 1991, hereby incorporated by reference.

Hartmann sensors utilize a mask with a matrix of holes or an array of lenslets, for example, for dividing the wavefront into a matrix of subapertures. Each of the beams from the subapertures is focused onto one or more position sensing detectors forming an array of the spot intensity on the detectors. The location of the spots provides a direct indication of the wavefront tilt at each subaperture. Unfortunately, the number of sample points of the phase front with such Hartmann sensors is relatively sparse. As such, the applications of such Hartmann sensors are limited to relatively mild turbulent conditions.

In unit shear (LSI) wavefront sensors, a copy of the wavefront is made and shifted in the x direction by a distance equal to the spacing between the actuators in the deformable mirror. The original and shifted beams are interfered in order to find the phase difference therebetween. The interference pattern is applied to an array of detectors. The intensity of the light interference pattern provides a measure of the wavefront x-tilt. Such unit shear LSI wavefront sensors may also be implemented in the y direction to obtain the y-tilt. With such unit shear LSI wave front sensors, the sampling resolution is limited by the size of the lateral shift. Unfortunately, selecting a shift that is too small causes serious degradation in the measurement accuracy. In addition, the inevitable accumulation of measurement noise also leads to reconstruction errors.

Holographic techniques are also known for detecting the wavefront of a light beam. Such holographic techniques utilize a reference beam with a known wavefront. The reference beam is heterodyned or mixed with the unknown wavefront to obtain an interference pattern or hologram. The phase front of the unknown beam is computed from the intensity profile of the interference pattern. There are two distinct advantages of the holographic technique over the other known techniques: (1) dense sampling and (2) heterodyning gain. Unfortunately, these advantages are also significant weaknesses. More particularly, to create a hologram, the reference beam needs to be coherent with the unknown incoming wave to satisfy the Fourier condition of $\Delta f \cdot \Delta t \ll 1$, where $\Delta f$ is the relative frequency drift and $\Delta t$ is the exposure time. For a continuous wave (CW) laser source, $\Delta t$ is typically limited to the photon flight time. Commercial CW lasers with sophisticated cavity control can achieve a $\Delta f$ down to about 300 kHz. Even then the coherence length, and thus the maximum range of operation, is still limited to only a few hundred meters. For longer range applications, a pulse laser with a $\Delta t$ of about 10 ns may be selected. However, overlapping the return and reference pulses to within a few nanoseconds is relatively difficult in a dynamic situation. An even greater obstacle is the uncompensated Doppler shift for a moving target. If, during the time of exposure, the optical path difference varies by more than $\lambda/4$, the hologram becomes washed out. For example, if the wavelength is 1 $\mu$m and $\Delta t$ equals 10 ns, to maintain a good contrast, the optical path difference must not vary faster than 25 m/s. Such parameters are relatively restrictive even for mobile targets. As such, laser coherence and target motion often render the holographic techniques impractical. In addition, such holographic adaptive optics systems require a reference beam. Thus, an adaptive optics system is needed which can provide relatively dense sampling of the phase fronts while eliminating the need for reference beam and allowing for relatively long range applications.

SUMMARY OF THE INVENTION

Briefly, the present invention relates to an adaptive optics system configured as an optical phase front measurement system which provides for relatively high resolution sampling as in holographic techniques but without the need for a reference beam. The optical phase front measurement system includes one or more lenses and a spatial light modulator positioned at the focal plane of the lenses and a camera which enables the phase front to be determined from intensity snapshots. The phase front measurement system allows for relatively long range applications with relatively relaxed criteria for the coherence length of the laser beam and the Doppler shift. As such, the system is suitable for a wide variety of applications including astronomy, long range imaging, imaging through a turbulent medium, space communications, distant target illumination and laser pointing stabilization.

DESCRIPTION OF THE DRAWINGS

These and other advantages of the present invention can be readily understood with the reference to the following specification and attached drawing wherein:

FIG. 1 is a diagram of a light beam partitioned into a matrix of pixels.

FIG. 2 is a block diagram of a phase front measurement system incorporating a phase spatial light modulator (SLM) in accordance with the present invention.

DETAILED DESCRIPTION

Figure 3:
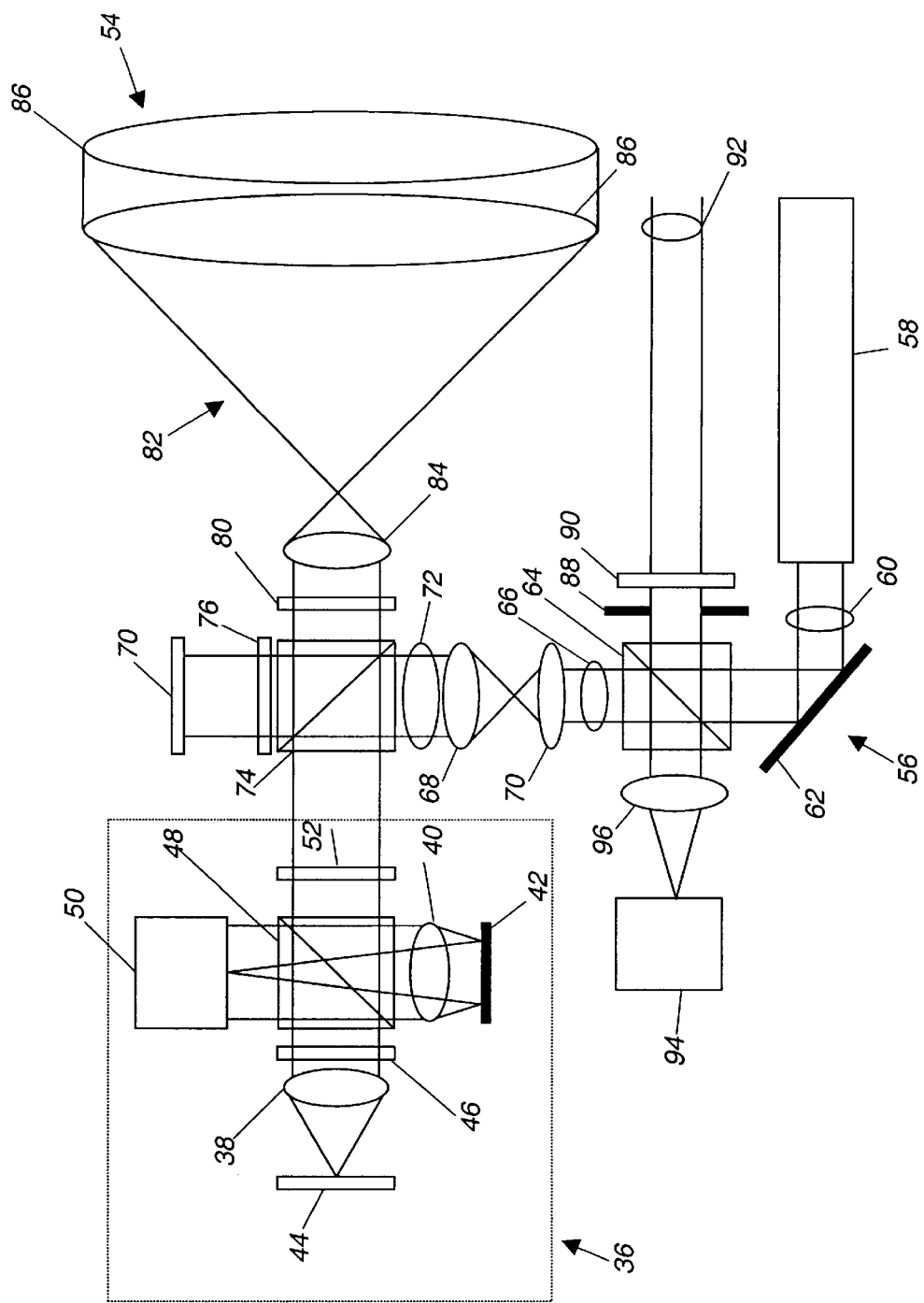
FIG. 3 is a block diagram of an optical system demonstrating beam point stabilization and image reconstruction utilizing phase front correction in accordance with the present invention.

The present invention relates to a optical phase front measurement system for measuring phase distortions in an optical wavefront which can be used in a closed feedback control loop to compensate for phase distortion, for example, due to turbulent atmosphere. The optical phase front measurement system includes a spatial light modulator disposed at the focal plane of a pair of spaced apart lenses and a camera to determine the phase distribution of the distorted wavefront.

The optical phase front measurement system is configured to determine or decode the phase front of a light beam from, for example, two snapshots of the wavefront. More particularly, for an optical beam that originates from a distant monochromatic source with phase front distorted by a turbulent medium, the mathematical description of the phase front is provided by equation (1) below.

$$E(x,y)\cdot\exp\{-j\cdot[k_x x+k_y y+\theta(x,y)]\}=A\cdot\exp\{-j[k_x x+k_y y]\}+B(x,y)\cdot\exp\{-j\cdot[k_x x+k_y y+\phi(x,y)]\}. \quad (1)$$

The expression after the equal sign is selected to distinguish the ideal (unperturbed) portion (first term) from a distorted portion (second term). The coefficients A, B(x, y) and E(x, y) are the corresponding amplitudes and can be selected to be positive and real. Since an ideal wavefront is virtually planar, the coefficient A is nearly independent of the variables x and y. The terms $k_x$ and $k_y$ are momentum vector components which contain angular information regarding the incoming wave. The term $\theta(x, y)$ is the distribution of the overall system phase distortion. The term $\phi(x, y)$ is an intermediate term describing the phase distortion of the distorted wavefront.

In order to correct the wavefront, the variables $k_x$, $k_y$ and $\theta(x, y)$ must be determined. These variables cannot be measured directly because a photodetector can only measure the intensity of a light source. However, as will be discussed in detail below, the configuration of optics system associated with the optical phase front measuring system in accordance with the present invention allows the variables $k_x$, $k_y$ and $\theta(x, y)$ to be determined. Once these variables are known, the phase profile of the entire wavefront can be determined as set forth below.

Referring the FIG. 1, the wavefront of a light beam, generally identified with the reference numeral 20, may be visualized by an array of pixels, e.g. pixel 22. Each of the pixels may be considered independent and may be encoded with intensity encoding and phase encoding. The intensity encoding is simply the square of the amplitude of the light beam for any given pixel. The phase encoding, unfortunately, cannot be measured directly since a photodetector can only measure intensity. As will be discussed in more detail below, the optical phase front measurement system is able to determine the system phase components $k_x$, $k_y$ and $\theta(x, y)$ utilizing the optics system illustrated in FIG. 2. The system illustrated in FIG. 2, generally identified with the reference numeral 24, relies on two relatively simple assumptions. First, in the Fourier representation as set forth in Equation (1) above, the pixel intensity contribution from the second term is much smaller than the peak of the first term for all of the pixels forming the beam 20. The first assumption is a reasonable assumption because the random phase term, $\phi(x, y)$, effectively spreads out or dilutes the energy of the second term, even if the term B(x, y) is greater than A. The second assumption is that the term B(x, y) consists mainly of low spatial frequency components. Essentially, this assumes that the scintillation is induced primarily by the randomness of the term $\phi(x, y)$. This assumption is also reasonable since the phase front is much more susceptible to turbulence than the amplitude front.

Given the first and second assumptions, a system for measuring the phase distribution can be developed as set forth in below with a pair of lenses 30 and 34, two cameras 32 and 33, and a beam splitter 35. In particular, it is known that the field of the light beam at the focal plane of a lens is the Fourier transform of the field in front of the lens, such as the lens 30 in FIG. 2. Incorporating this fact with the first assumption indicates that the field exhibits a peak at the location $<k_x, k_y>\sim-\lambda f/(2\pi)$, where $\lambda$ is the wavelength and f is the focal length. With the beam splitter 35, a camera 33 can sample the beam at the focal plane 28 to measure the relative peak intensity A and its location $<x_p, y_p>$. The variables $<k_x, k_y>$ will be equal $-2\pi<x_p, y_p>/(\lambda f)$. As will be demonstrated below in connection with FIG. 3, with a more sophisticated set up, the cameras 32 and 33 may be replaced with just one camera.

The first assumption ensures that the coefficient A is very closely proportional to the peak intensity reading. Next, assuming the spatial light modulator 26 is placed at the focal plane 28 of the lenses 30 and 34, with the Fourier transform of the beam by the first lens 30 is reversed by the second lens 34. If all of the pixels produced by the SLM are in the same state, the output field is equivalent to the spatially flipped version of the input field. The intensity of this field as seen by camera 32 is given Equation (2).

$$I_1=A^2+B^2(-x,-y)+2A\cdot B(-x,-y)\cdot\cos[\phi(-x,-y)]. \quad (2)$$

As is known in the art, the SLM 26 can provide a 90° phase shift to the pixel corresponding to the peak intensity or the A term. After the phase shift, the field is as described in terms of its quadrature components as shown in Equation (3) below.

$$j\cdot A\cdot\exp\{j\cdot[k_x x+k_y y]\}+B(-x,-y)\cdot\exp\{j\cdot[k_x x+k_y y+\phi(x,y)]\}. \quad (3)$$

The intensity of this field as seen by camera 32 is provided by Equation (4).

$$I_2=A^2+B(-x,-y)^2+2A\cdot B(-x,-y)\cdot\sin[\phi(-x,-y)]. \quad (4)$$

The first two terms can be removed by high pass filtering as set forth in the second assumption. The phase distribution $\theta(x, y)$ of the pixels 20 (FIG. 1) can then be determined from equation (5).

$$\theta(-x,-y)=\mathrm{ATAN2}\{B(-x,-y)\cdot\sin[\phi(-x,-y)], A+B(-x,-y)\cdot\cos[\phi(-x,-y)]\}=\mathrm{ATAN2}\{2A\cdot B(-x,-y)\cdot\sin[\phi(-x,-y)],$$
$$2A^2+2A\cdot B(-x,-y)\cdot\cos[\phi(-x,-y)]\}=\mathrm{ATAN2}[\mathrm{HP}(I_2), 2A^2+\mathrm{HP}(I_1)], \quad (5)$$

where HP denotes high pass filtering.

As mentioned above, the coefficient A is determined from the peak intensity in the focal plane while the variables $k_x$ and $k_y$ are determined from the location of the peak intensity. The variable $\theta(x, y)$ is determined as set forth in Equation (5). Knowing $k_x$, $k_y$ and $\theta(x, y)$ enables the entire phase front to be decoded in the accordance with Equation (1) from the two snapshots ($I_1$ and $I_2$).

The phase measurement system in accordance with the present invention may be implemented by the system is based upon the principles discussed above and illustrated in FIG. 2 which includes a pair of spaced apart lenses 30 and 34 and a spatial light modulator 26 disposed at the focal plane of those lenses. As mentioned above, the system also includes a beam splitter 35 as well as the camera 33 to measure the peak pixel intensity and location and the camera 32 to sample two quadrature signals that are used to compute or decode the phase front of the incoming light beam. Upon determining the variables $k_x$, $k_y$ and $\theta(x, y)$ from the measurements information, as detailed above, the phase front of the light beam 20 is then completely characterized.

This phase front information can now be used in part of a closed loop feedback system (not part of the present invention) to provide phase compensation of the individual wavefront elements.

The lenses 30 and 34 may be two identical plano/convex lenses with the focal lengths chosen lenses to set the magnification to match the SLM pixel size. The spatial light modulator 26 may be a liquid crystal (LC) phase spatial light modulator, for example, a 512×512 small array analog LC SLM by Boulder Nonlinear Systems, Inc. The cameras 32 and 33 need to be of high frame rate and may be a DALSTAR CA-06 by Dalsa, which can sample at nearly 1 KHz.

A practical implementation of the phase measurement illustrated in FIG. 2 is shown in the box 36 illustrated in FIG. 3 and identified as a phase mapping analyzer. In particular, the phase mapping analyzer 36 includes a pair of lenses 38 and 40, oriented such that their optical axis are generally perpendicular to one another. A reflective mirror 42 is disposed behind the lens 40 while a reflective spatial light modulator (SLM) 44 is positioned at the focal plane of lens 38. The SLM 44 may be a phase SLM, for example, as discussed above, which includes a back plate reflector so that light transverses the phase shifting elements twice. Such a configuration reduces the amount of nonlinear phase shifting the individual element must introduce and thus reduces the response time. The configuration of the lens 38 and the reflective SLM 44 is equivalent to the pair of lenses 30 and 34 and non-reflective SLM 26, illustrated in FIG. 2, if the output is separated from the input. Referring back to FIG. 3, the separation of the input and the output beams is accomplished by way of a λ/4-wave plate 46 and a polarizing beam splitter 48. Traveling through the λ/4-wave plate 46 twice rotates the linearly polarized input beam by 90°, causing the return beam to be almost entirely reflected by the beam splitter 48 onto an analysis camera system 50. A small portion of the input beam is sampled by the lens 40 and the mirror 42 and focused onto the same analysis camera system 50. Here, the camera 50 takes the place of both cameras 32 and 33 in FIG. 2, and it may be of the DALSTAR CA-06 by Dalsa. Thus, in one snapshot, the Fourier peak location and intensity along with one intensity profile needed for calculating the phase profile can be determined. In order to increase the image quality, a laser line interference filter 52 may be utilized to attenuate background noise.

A practical application of the phase front measurement system 36 is illustrated in FIG. 3 and generally identified with the reference numeral 54. The system 54 incorporates the phase measurement system 36 for both beam point stabilization and image construction to: (1) maximize the beam delivery of the laser onto a distant target and (2) compensate for phase distortion by turbulence.

The system 54 includes a beam delivery subsystem, generally identified with the reference numeral 56. The beam delivery subsystem includes, a laser 58 such as a Helium-Neon, a VAG, or a semiconductor laser, as described in detail in "Laser Electronics," Third Edition, Joseph T. Verdeyen, Prentice Hall, 1994, hereby incorporated by reference. The laser output beam 60 is directed to a totally reflective mirror 62 disposed, for example, at a 45° angle relative to the optical axis of the laser 58 to rotate the beam 60 at roughly 90° relative to the optical axis of the laser 58 and direct the beam 60 to a partial beam splitter 64. The probe beam 66 from the partial beam splitter 64 is directed to a pair of spaced apart plano/convex lenses 68 and 70 to expand the beam to match the dimensions of a reflective SLM 70. The expanded beam, identified with the reference numeral 72, is directed through polarizing beam splitters 74, a λ/4-wave plate 76 and is phase modulated by the phase SLM 70. The SLM 70 induces the phase correction, as measured by the phase mapping analyzer 36, onto the outgoing beam. It may be of the same type as SLM 44 by Boulder Nonlinear Systems, Inc. The phase SLM 70 is provided with a reflective plate to allow the beam to be reflected back to the λ/4-wave plate 76 with a 90° polarization rotation, The polarizing beam splitter 74 reflects the beam out to the target by way of another λ/4-wave plate 80 and a telescope beam expander 82, formed from a pair of spaced apart lenses 84 and 86. The output beam from the telescope beam expander 82 defines the outgoing probe beam 86.

The probe beam 86 is directed to a distant target. Reflected signals from the target are received from the telescope beam expander 82 and are redirected to the λ/4-wave plate 80 resulting in another 90° polarization rotation which transmits the reflected beam through the polarized beam splitter 74 to the phase measurement device 36.

Initially, all of the pixels in the SLM 70 are off. As the phase measurement device 36 maps out the phase front, the complement of the phase front is displayed in the SLM 70 to modulate the phase conjugate of the phase front onto the outgoing laser beam. This phase conjugation reverses the turbulence distortion, thus enhancing the beam delivery onto the target. This, in turn, increases the strength of the return signal, which, in turn, increases the accuracy of the phase mapping. Such positive feedback can converge very quickly and can significantly improve the system performance.

As mentioned above, the system illustrated in FIG. 3 also provides for image enhancement. In particular, a portion of the initial laser beam is reflected by the partial beam splitter 64 through an aperture λ/4-wave plate 90 to form an illumination beam 92. The wave plate 90 is configured such that the polarization of the illumination beam 92 is orthogonal to that of the probe beam 86. The reflected illumination beam is collected by the telescope 82 and travels through the wave plate 80 and is reflected by the partial beam splitter 74 to the SLM 70. Here, the SLM 70 undoes the phase front distortion and, with the help of the wave plate 76, reflects these signals onto an imaging camera 94 by way of a partial beam splitter 64 and a lens 96. The camera 94 may be of the same type of camera 50, the DALSTAR CA-06 by Dalsa. However, because speed is not critical for the camera 94, it can be replaced with a less costly commercial camera. The aperture 88 is used to minimize the amount of light onto the camera that has not arrived through telescope 82. The illumination beam 92 is not expanded by a telescope 82; thus it has a much larger divergence than the outgoing probe beam 86 and is of larger in area at a far distance. In essence, the probe beam 86 seeks out the brightest spot and uses it as a guide start to map out the aberration front while the illumination beam 92 lights the scenery for the imaging camera 94.

In accordance with the present invention, a numerical reconstruction of the phase front is computationally simple and can be accomplished in real time with a relatively fast PC, for example, a Pentium II or better system. The system in accordance with the present invention is relatively light and compact and can be built using commercially available off-the-shelf parts.

Obviously, many modification and variations of the present invention are possible in light of the above teachings. For example, thus, it is to be understood that, within the scope of the appended claims, the invention may be practiced otherwise than as specifically described above.

What is claimed and desired to be secured by Letters Patent of the United States is:

1. A phase front measurement system comprising:
   one or more lenses defining first optical axis;
   a spatial light modulator (SLM) disposed at the focal plane of said one or more lenses along said optical axis;
   a camera system including a first camera configured to receive beams and sample a light field passing through said SLM and said one or more lenses and generate quadrature signals; and
   means responsive to said camera system for determining the phase front based upon said quadrature signals from the camera system.

2. The phase front measurement system as recited in claim 1, wherein said phase front measurement system is formed with two spaced apart lenses and said SLM is disposed at the focal plane of said two lenses.

3. The phase front measurement system as recited in claim 1, wherein said phase front measurement system is formed with a reflective SLM and one lens.

4. The phase front measurement system as recited in claim 2, wherein said camera system further includes a beam splitter and a second camera, the second camera and said beam splitter positioned to enable said second camera sample the light field at the focal plane of said two spaced apart lenses.

5. The phase front measurement system as recited in claim 4, wherein said first camera is disposed along said first optical axis.

6. The phase front management system as recited in claim 4, wherein said determining means determines the phase front based upon a first snapshot from said first camera and a second snapshot from said second camera.

7. The phase front measurement system as recited in claim 3, wherein said first camera is disposed away from said first optical axis.

8. The phase front measurement system as recited in claim 7, farther including a quarter wave plate disposed along said first optical axis and a polarizing beam splitter also disposed along said first optical for directing polarized light beams along a second optical axis, wherein said first camera is disposed along said second optical axis.

9. The phase front management system as recited in claim 8, wherein said determining means determines the phase front based upon a single snapshot.

10. A phase front measuring system comprising:
    one or more lenses defining an optical axis;
    a spatial light modulator disposed at the focal plane of said one or more lenses; and
    a camera system for taking one more more snapshots and generating quadrature signals; and a determining system responsive to said quadrature signals for determining the phase front of a light beam.

11. The phase front measuring system as recited in claim 10, wherein said camera system includes two cameras and said determining means determines the phase front based upon a snapshot from each camera.

12. The phase front measuring system as recited in claim 10, wherein said camera system includes a single camera and said determining means determines the phase front based upon a single snapshot.

13. A method for determining the phase front of a light beam comprising the steps of:
    (a) providing a pair of spaced apart lenses defining an optical axis;
    (b) providing a spatial light modulator (SLM) at the focal plane of said pair of spaced apart lenses along said optical axis;
    (c) providing a beam splitter along said optical path;
    (d) providing a camera system including a first camera along said optical axis disposed adjacent one end of one lens opposite said SLM and a second camera, said beam splitter and said second camera configured to sample the light beam at said focal plane, said first and second cameras adapted to provide snapshots of said peak intensity and locations of said light beam;
    (e) determining the phase front based on a snapshot from each camera.

14. A method for determining the phase front of a light beam comprising the steps of:
    (a) providing a lens defining first optical axis;
    (b) providing a reflective spatial light modulator (SLM) along said optical path;
    (c) providing a quarter wave plate and a polarizing beam splitter along said first optical axis, said polarizing beam splitter reflecting a portion of said light beam along a second optical axis;
    (d) providing a camera system away from said optical axis configured to said camera providing quadrature signals of said light beam;
    (e) determining the phase front based on said quadrature signals from said camera system.

15. The method as recited in claim 14 wherein said determining means determines the phase front based on a single snapshot.

* * * * *